Patented May 27, 1952

2,598,483

UNITED STATES PATENT OFFICE 2,598,483

PIGMENTS FROM 2-CHLORO-5-AMINO-ETHYLBENZENE - 4 - SULFONIC ACID AND BETA NAPHTHOL

Frederic Henry Adams, Bound Brook, N. J., assignor to American Cyanamid Company, New York, N. Y., a corporation of Maine No Drawing. Application August 16, 1949, Serial No. 110,667

6 Claims. (Cl. 260—197)

This invention relates to azo coloring matters and particularly to azo pigments useful as toners for lithol reds.

A number of red pigments obtained by diazotizing various aminosulfonic acids and coupling with beta naphthol have obtained very extensive use in printing inks. These are referred to as the lithols. An important lithol red is obtained by diazotizing 2-naphthylamine-1-sulfonic acid and coupling with beta naphthol. The alkali and alkaline earth metal derivatives are extensively used. However, this red pigment is not suitable for many printing inks and other purposes because it is a blue red and it is necessary to tone it to obtain the desired shade of yellow red. A number of coloring matters have been proposed as toners for the lithol above referred to but have not been satisfactory. Some show poor working properties in the inks and other media in which the pigment is to be used, and others are not sufficiently fast to light and fade badly off-shade. The problem of a satisfactory toner has therefore remained unsolved practically, particularly as it should be remembered that, in addition to satisfactory color and fastness properties, the toner must be of high tinctorial strength so that it can be used in small amounts, and it must be cheap because one of the great virtues of the lithol pigments is their relatively low cost in comparison to color strength which makes them suitable for a wide variety of uses where cost is an important factor.

According to the present invention, I have found that coloring matters of the following formula:

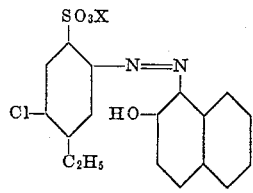

in which X is a cation, and particularly the alkali and alkaline earth metal compounds, which are cheap, stable coloring matters, solve the problem of a practically satisfactory toner to impart yellow shades to lithol reds. The desirable properties of the compounds are particularly striking and unexpected because closely related compounds, such as the next lower homologue, are blue red and not suitable for toning lithols to impart the needed yellow shade. Also, the lower homologue shows inferior light fastness and from this point is not useful as a toner for lithols to be used under circumstances where fading may take place. It is not known why there should be such striking differences between closely related chemical compounds, and particularly why there should be so great a difference and also improved light fastness. It is, therefore, not desired to limit the present invention to any theoretical explanation of why such major changes, all on the desirable side, take place when the change in chemical constitution is such as would lead one ordinarily to expect that there would be little or no difference in the characteristics of the product.

It is an advantage of the present invention that the new toner can be prepared by ordinary means and no new or critical procedural techniques are required.

The invention will be described in greater detail in the following specific examples. Parts are by weight.

Example 1

140 parts of ethylbenzene are charged into an enameled, jacketed kettle with stirrer and reflux condenser. The charge is heated to 95° C., and there is slowly added 264 parts of 99.5% sulfuric acid, the temperature being maintained at 90–100° C. After all of the sulfuric acid has been added, the heating is continued until sulfonation is complete, the final temperature rising to about 116° C.

To the reaction mixture, containing the ethylbenzene-p-sulfonic acid produced above, there is added 380 parts of 99.5% sulfuric acid and 0.7 part of anhydrous ferric chloride. The reaction mixture is heated to 50° C. with stirring, and gaseous chlorine passed in until chlorination is complete. The hydrogen chloride evolved, and excess chlorine, are removed by passing compressed air through the charge.

The reaction mixture, containing o-chloroethylbenzene-p-sulfonic acid is cooled to 18° C. and 113 parts of 74% nitric acid is cooled to 18° C. and temperature being maintained at 25-30° C. during the addition. After all of the nitric acid has been added, the charge is stirred for many hours until the reaction is complete, and then is drowned in a salt solution containing 236 parts of salt in 1,000 parts of water. After drowning, 670 parts of saturated salt brine is added, the charge is cooled to room temperature and filtered. The filter cake is then washed with 1330 parts of saturated brine.

The nitro compound produced above is reduced as follows: A solution of 1.7 parts of glacial acetic acid in 350 parts of water, containing 37.2 parts of powdered iron is charged into a stainless steel kettle and heated to gentle reflux. One-eighth of the nitro compound press cake is dissolved by heating to 70° C. in a solution of 1.7 parts of glacial acetic acid in 250 parts of water. This is added to the gently boiling charge in the kettle. After addition is complete, heating under reflux is continued until the reduction is substantially complete. 17 parts of 20% sodium hydroxide solution is then added and the iron sludge filtered from the resulting alkaline solution and washed with 250 parts of hot water. The filtrate is strongly acidified with 31 parts of 20° Bé. hydrochloric acid and the 2-chloro-5-aminoethylbenzene-4-sulfonic acid filtered off, washed with water, and dried at 60° C.

*Example 2*

118 parts of the 2-chloro-5-aminoethylbenzene-4-sulfonic acid prepared in Example 1 is dissolved in 2500 parts of water containing 135 parts of 5N sodium hydroxide. Ice is added to bring the temperature down to 3° C., and the mixture is then acidified with 285 parts of 5N hydrochloric acid, and the resulting slurry diazotized in the normal manner by the addition of 100 parts of 5N sodium nitrite solution.

75 parts of beta naphthol are dissolved in 110 parts of 5N sodium hydroxide and 110 parts of water, 1.5 parts of soap flakes being added, and the whole heated to 70° C. until solution is complete. The solution is cooled and gradually added to the diazo slurry, the preparation of which is described above, the temperature being maintained at 12–16° C. during the addition. After the addition is complete, 75 parts of 5N caustic soda solution is added. The mixture is stirred until coupling is complete and then neutralized with acetic acid. The sodium salt precipitates and is filtered, constituting an orange pigment practically free from bronze.

*Example 3*

The pigment is prepared as in Example 2, but after filtration it is stirred in 4,000 parts of water and a solution of 145 parts of barium chloride dihydrate in 1,000 parts of water is added, and the mixture heated to 95–100° C., until the formation of the corresponding barium salt is complete. The mixture is then cooled with ice to 70° C., filtered and washed. The barium toner obtained is dried at 60° C. and is a bright orange pigment of good light fastness, yellowish tint and light masstone. It is superior in light fastness to the corresponding barium compound of the next lower homologue and is yellower in shade.

*Example 4*

The procedure of Example 3 is followed, but a solution containing 70 parts of calcium chloride is substituted for the barium chloride. After boiling for a short time until the salt formation is complete, the slurry is cooled with water to 70° C., filtered, and the filter cake dried at 60° C. The toner produced is of excellent light fastness and, as compared to the barium toner, is much lighter in masstone and yellower in shade and undertone.

I claim:

1. A compound of the formula:

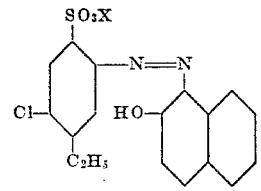

in which X is a cation selected from the class consisting of the alkali metals and the alkaline earth metals.

2. A product according to claim 1 in which the cation is an alkali metal.

3. A product according to claim 2 in which the alkali metal is sodium.

4. A product according to claim 1 in which the cation is an alkaline earth metal.

5. A product according to claim 4 in which the alkaline earth metal is calcium.

6. A product according to claim 4 in which the alkaline earth metal is barium.

FREDERIC HENRY ADAMS.

REFERENCES CITED

The following references are of record in the file of this patent:

UNITED STATES PATENTS

| Number | Name | Date |
| --- | --- | --- |
| 733,280 | Schirmacher | July 7, 1903 |
| 2,013,075 | Siegel | Sept. 3, 1935 |
| 2,225,665 | Siegel | Dec. 24, 1940 |
| 2,229,049 | Dahlen et al. | Jan. 21, 1941 |